Patented May 23, 1950

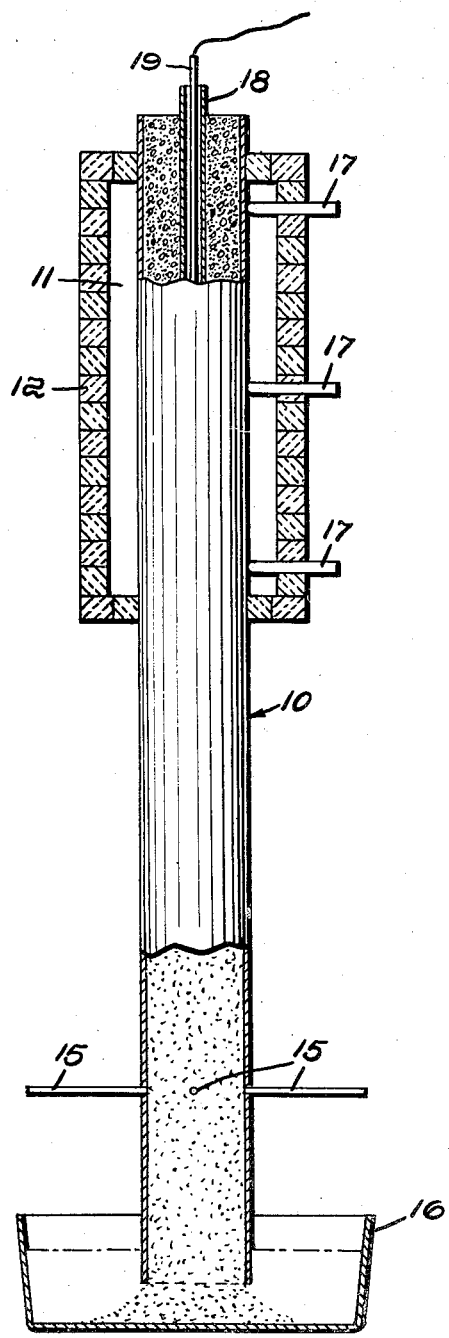

2,508,515

UNITED STATES PATENT OFFICE 2,508,515

METHOD FOR REDUCING IRON OXIDE

Carle R. Hayward, Quincy, and Livingston Wright, Marshfield Hills, Mass., assignors to Metal Hydrides Incorporated, Beverly, Mass., a corporation of Massachusetts Application January 7, 1949, Serial No. 69,692

1 Claim. (Cl. 75—37)

This invention relates to the production of steel from materials which are predominately iron oxide, such as lump hematite ore, sintered magnetite concentrates and sintered residues from roasted pyrite. These materials may contain other metal oxides, such as nickel oxide or titanium dioxide.

Many years prior to the present invention, it has been suggested that sponge iron might be produced by reducing porous sintered lumps of iron oxide by feeding them through a vertical stack by gravity while heating the lumps and passing a reducing gas through the stack in the opposite direction. However, it has been long known by those skilled in the art that this suggested method has not been successful for various reasons. For example, Stahl and Eisen, vol. 52, pages 457–461, in referring to tests of this method, states that the reduced iron tended to sinter together rendering the descent of the lumps irregular and causing them to become too compact to permit passage of the reducing gases.

The normal reactions between ferric or ferrous oxide and hydrogen may be represented by the following equations:

(1) $Fe_2O_3 + 3H_2 \rightarrow Fe + 3H_2O$
(2) $Fe_3O_4 + 4H_2 \rightarrow 3Fe + 4H_2O$ The reactions probably take place in several stages as represented by the following equations:

(3) $3Fe_2O_3 + H_2 \rightarrow 2Fe_3O_4 + H_2O$
(4) $2Fe_3O_4 + 2H_2 \rightarrow 6FeO + 2H_2O$
(5) $6FeO + 6H_2 \rightarrow 6Fe + 6H_2O$ Thus, ferric and ferrous oxides probably are reduced first to a lower oxide as represented by FeO, this being an endothermic reaction. The lower oxide then probably is reduced to still lower oxides and finally to metallic iron. At least some of the latter reactions appear to be exothermic. It may be noted that Reaction 5 takes about three times longer than Reaction 4, under the same conditions.

Our research has demonstrated that when hydrogen is used for reducing iron oxide at elevated temperatures an exothermic reaction may occur under certain conditions. If this reaction proceeds rapidly there will be an appreciable rise in the temperature of the charge. A moderate rise may be beneficial and promote reduction but an excessive rise may promote sintering and bridging of the charge. The position and intensity of the exothermic reaction can be changed by varying the hydrogen flow. A strong flow of hydrogen would normally increase the ratio of hydrogen to water and promote the exothermic reaction. With a strong inflow of cool hydrogen, however, the heat in the descending charge is quickly removed and the reduced temperature of the charge greatly decreases the speed of reactions. The net result is that a temperature for rapid reaction is not reached until the rising current of hydrogen passes over sufficient of the charge to be thoroughly preheated. If the flow of hydrogen is decreased the gas becomes preheated sooner and the exothermic reaction takes place lower in the stack. It is possible to use a flow of hydrogen so strong that the temperature is too low to promote the exothermic reaction. It is also possible to use a flow so small that the ratio of hydrogen to water becomes so small that the reaction is smothered. In either of the last two instances, incomplete reduction results.

We have discovered that iron oxide can be substantially completely reduced by a hydrogen containing gas while the oxide is moved along a vertical path, such as a vertical stack, by the action of gravity. In accordance with the present invention the descent of the charge can be maintained regular and uniform without sintering together and becoming too compact to permit uniform distribution of the reducing gas. In the practice of the invention heat is supplied externally to the surface of an intermediate portion of the vertical path to maintain its temperature between about 800° C. and 1100° C. This externally supplied heat is transmitted to the charge and serves as one means for controlling the temperature of the charge. Preferably, the temperature of the externally heated zone at its top is between 950° C. and 1050° C. and the temperature at its bottom is between 800° C. and 900° C. with a gradual temperature gradient therebetween. The reducing gas is introduced at substantially room temperature at a region spaced from the bottom of the principal reaction zone, that is, the above mentioned intermediate portion of the vertical path. As this gas passes upward it serves to cool the charge as the latter moves downward out of the reaction zone. The gas thus becomes preheated and serves to distribute heat and control the temperature of the charge in the reaction zone. The hot gases passing upward from the reaction zone serve to preheat the charge as it moves downward in the reaction zone. Under these conditions of operation the stream of reducing gas does not cool the descending charge undesirably low as the latter leaves the section of the stack surrounded by the externally heating chamber. The stack may extend upward beyond the externally heated section a distance sufficient to provide an adequate zone in which the charge may be preheated by the rising hot gases.

The essential component of the reducing gas is hydrogen. Thus, the reducing gas may be pure hydrogen, water gas or a gas which decomposes under the conditions of operation to form hydrogen, such as ammonia, methane or other hydrocarbon or mixtures of such gases. The amount of such gas used should be considerably in excess of the stoichiometric amount required to effect complete reduction of the charge as it passes through the reaction zone and may be from 75 to 100 per cent in excess of such amount. The minimum amount of hydrogen required, taking into account the equilibrium factor for the ratio of hydrogen to water, is approximately 60 to 70 per cent in excess of the stoichiometric amount at 800° C. The equilibrium factor varies with the temperature and composition of the charge.

We have discovered that for most satisfactory and most efficient operation, the zone of the exothermic reaction should start substantially midway between the top and bottom of the reaction zone. The temperature of the charge in the exothermic zone is in the neighborhood of 25° C. higher than at the corresponding externally heated surface of the reaction zone. This excess heat is swept away from local areas by the rising volume of hydrogen containing gases due to the great heat absorbing capacity of the latter. The position of the exothermic reaction can be controlled at will by changing the ratio of the average rate of movement of the charge to the amount of reducing gas introduced. By adjusting this ratio so that the exothermic reaction starts not substantially below the region midway between the top and bottom of the reaction zone, that is, within the middle third of the reaction zone, a sufficient time interval is provided to assure substantially complete reduction of the iron oxide. During this period of the reaction, excess heat is absorbed from local areas and sintering and bridging of portions of the charge is prevented.

We have further discovered that the rate of reduction may be increased as much as 25 per cent if the charge contains from 2 to 5 per cent by weight of charcoal. The charcoal does not appear to be consumed to any substantial extent. By discharging the reduced material into water, the charcoal floats and can be removed.

We have further discovered that when the material being reduced is of low grade, that is, contains substantial amounts of silica and the like, less care is required in positioning the exothermic zone midway of the reaction zone. Thus, when reducing a medium grade magnetite sinter containing 62.2% Fe, 5.7% $SiO_2$, 2.38% $Al_2O_3$, 2.6% CaO and 7.75% MgO and small amounts of P, Mn and S, the exothermic zone may be positioned close to the top of the reaction zone without danger of sintering and bridging of portions of the charge if the other specified conditions of operation are maintained. The size of the lumps of this sinter, preferably, should be between ¼ inch mesh and 2 inches.

When reducing a high grade material such as Brazilian hematite ore containing approximately 68.80% Fe, 0.38% P, 0.30% $SiO_2$ and 0.30% $Al_2O_3$ in its natural unsintered condition the preferred operating conditions previously mentioned should be carefully observed and the material should be carefully sized to one half to one inch. In practice we prefer to mix this material with from 25 to 75 per cent by weight of a low grade material or a medium grade material, such as the medium grade magnetite sinter previously mentioned. Thus, in accordance with our present preferred practice, we employ as the material to be reduced one containing a refractory oxide in an amount not less than about 5 to 10 per cent by weight, the refractory oxide being an oxide of a metal or metalloid having a heat of formation not less than about 140,000 gram calories such as silica, magnesia, alumina, calcium oxide, titanium dioxide, etc. Such a refractory oxide is not reducible with hydrogen at the temperature used.

We have reduced a considerable quantity of magnetite sinter having an approximate analysis of 59.6% Fe, 2.0% $SiO_2$, 4% $Al_2O_3$, 1.0% CaO and 9.2% $TiO_2$ sized between ¼ mesh and 2 inches.

Another material used in the course of our research was an ore containing 41% metal sulfides and 59% non-metallic minerals. The metallic sulfide portion contained 32% pyrrhotite (FeS), 6% pentlandite (FeNiS) and 3% chalcopyrite ($CuFeS_2$) or approximately 32% iron and 2.75% nickel. The non-metallic minerals were removed by floatation. The separated metallic sulfides were subjected to an oxidizing roast. This roasted material then was subjected to a chloridizing roast to chloridize selectively the copper and the copper chloride removed by leaching. The finely divided residue, which was a mixture of oxides of iron and nickel, was sintered to form lumps about the size of a chocolate drop. These lumps then were reduced as previously described either with or without 2 to 5% charcoal by weight. It is obvious that a mixture of nickel oxide and iron oxide from and source may be similarly treated.

The reduced material may be melted by any well known means, such as a high frequency electric furnace and cast. The iron and nickel alloy produced averaged from a trace to 0.75% copper, 8 to 9% nickel, 0.01% silicon, 0.04% to 0.08% carbon, 0.006% phosphorus, sulfur nil and the balance iron. When the reduced material containing $TiO_2$ is melted, the $TiO_2$ passes into the slag formed on top of the molten metal and may be removed and recovered from the slag.

A suitable stack furnace for use in the practice of the invention is illustrated in the single figure of the accompanying drawing which is an elevational diagrammatic view, partly in section. The furnace comprises a stainless steel tube 10 about 12 feet long and 12 inches inside diameter and having a wall ³⁄₁₆ inch thick. The upper portion of the tube 10 was surrounded by an annular combustion chamber 11 about 3¾ inches by about 4½ feet enclosed by insulating brick 12. The combustion chamber was heated by six gas-air burners (not shown), the gas and air being under thermostatic control. Four ¼ inch pipes 15 pierced the tube 10 about two feet from its lower end and served for introducing hydrogen or other reducing gas. The lower end of the tube 10 was sealed by water in a steel pan 16, the bottom of the pan being about four or five inches below the lower end of the tube. Thermocouples 17 project into the combustion chamber for indicating the temperature at the top, bottom and middle regions thereof. A stainless steel protection tube 18 was placed vertically near the middle of the tube 10 to house a thermocouple 19 which could be moved up and down to study the temperatures at various points.

In operation, the tube 10 is filled with partly or completely reduced material. Some of the material is drawn from the bottom of the tube to loosen the charge so it will descend uniformly. Water is poured into the pan 16 until it reaches a level about four inches above the bottom of the tube 10. The burners then are turned on to heat the combustion chamber 11 to a temperature of about 700 to 800° C. This requires about four hours. Before the temperature of the charge within the reduction tube 10 reaches red heat, the tube is purged with nitrogen and then hydrogen is introduced through the pipes 15. Material is withdrawn at about hourly intervals and then at half hour intervals. After each withdrawal partly reduced material is added at the top of the tube 10, keeping the charge level constant. After about four or five hours unreduced iron oxide material is substituted for the partly reduced charge and the operation is continued under the desired conditions of temperature of the externally heated zone, gas flow and rate of withdrawal of the charge.

Particularly satisfactory results from the view point of highest capacity with good reduction and good furnace operation were obtained using 70 pounds of the medium grade magnetite sinter previously mentioned per 1000 cu. ft. of hydrogen with a temperature of 950° C. in the externally heated chamber, that is, when the material was discharged at the rate of 70 pounds per hour. This is close to the thermodynamic equilibrium ratio for this temperature and material when securing complete reduction. When using the 70:1000 ratio the exothermic zone is near the middle of the heating chamber, the exothermic reaction zone being higher in temperature than the heating chamber outside the tube.

We claim:

In a method for reducing iron oxide, the steps which comprise moving a mass of small lumps, which are predominately iron oxide, downward along a vertical path in contact with a reducing gas, heating a selected single portion of the length of said path constituting the reaction zone by supplying heat externally to the surface of said portion only, passing the reducing gas upward through said portion, adjusting the ratio of the average rate of movement of said lumps through said path to the amount of reducing gas introduced to start the exothermic reaction, which takes place between said oxide and the reducing gas, at substantially the region midway between the top and bottom of said portion, and then maintaining such ratio thereby assuring substantially complete reduction of said oxide before passing out of said portion and thereafter rapid cooling of the reduced material, the temperature of said surface being about 800° C. at the bottom of portion and about 1100° C. at the top of said portion with a gradual gradient therebetween, said reducing gas being selected from the group consisting of hydrogen and a gas capable of producing hydrogen under the conditions of operation, the amount of said hydrogen being not less than about 60 per cent in excess of the stoichiometric amount required to effect complete reduction of said oxide as it passes through said portion.

CARLE R. HAYWARD.
LIVINGSTON WRIGHT.

REFERENCES CITED

The following references are of record in the file of this patent:

UNITED STATES PATENTS

| Number | Name | Date |
| --- | --- | --- |
| 126,924 | Blair | May 21, 1872 |
| 1,269,054 | Clark | June 11, 1918 |
| 1,964,402 | Kalling et al. | June 26, 1934 |
| 2,080,028 | Avery | May 11, 1937 |
| 2,166,207 | Clark | July 18, 1939 |

FOREIGN PATENTS

| Number | Country | Date |
| --- | --- | --- |
| 2,677 of 1876 | Great Britain | June 29, 1876 |